US009753520B2

(12) United States Patent
Bailey et al.

(10) Patent No.: US 9,753,520 B2
(45) Date of Patent: Sep. 5, 2017

(54) PREDICTIVE POWER CAPPING AND POWER ALLOCATION TO COMPUTING NODES IN A RACK-BASED INFORMATION HANDLING SYSTEM

(71) Applicant: DELL, INC., Round Rock, TX (US)

(72) Inventors: Edmond Bailey, Cedar Park, TX (US); John R. Stuewe, Round Rock, TX (US); Paul W. Vancil, Austin, TX (US); Kunrong Wang, Austin, TX (US); German Florez-Larrahondo, Georgetown, TX (US)

(73) Assignee: Dell Products, L.P., Round Rock, TX (US)

( * ) Notice: Subject to any disclaimer, the term of this patent is extended or adjusted under 35 U.S.C. 154(b) by 311 days.

(21) Appl. No.: 14/139,765

(22) Filed: Dec. 23, 2013

(65) Prior Publication Data

US 2015/0177814 A1  Jun. 25, 2015

(51) Int. Cl.
*G06F 1/32* (2006.01)
*G06F 1/28* (2006.01)

(52) U.S. Cl.
CPC .............. *G06F 1/3234* (2013.01); *G06F 1/28* (2013.01); *G06F 1/3206* (2013.01)

(58) Field of Classification Search
CPC .................................................... G06F 1/3234
See application file for complete search history.

(56) References Cited

U.S. PATENT DOCUMENTS

| | | | | |
|---|---|---|---|---|
| 7,770,035 B1* | 8/2010 | John | ...................... | G06F 1/3203 713/300 |
| 9,625,974 B2* | 4/2017 | Bailey | ................... | G06F 1/3234 |
| 2011/0144818 A1* | 6/2011 | Li | ......................... | G06F 1/3203 700/291 |
| 2012/0116590 A1* | 5/2012 | Florez-Larrahondo | . | G06F 1/206 700/275 |
| 2012/0216055 A1* | 8/2012 | Dumas | ...................... | G06F 1/26 713/320 |
| 2014/0149761 A1* | 5/2014 | Allen-Ware | .................. | 713/320 |

* cited by examiner

*Primary Examiner* — Kim Huynh
*Assistant Examiner* — Joshua Neveln
(74) *Attorney, Agent, or Firm* — Isidore PLLC

(57) ABSTRACT

A computer-implemented method enables rack-level predictive power capping and power budget allocation to processing nodes in a rack-based IHS. A rack-level management controller receives node-level power-usage data and settings from several block controllers, including current power consumption and an initial power budget for each node. A power consumption profile is generated based on the power-usage data for each node. A total available system power of the IHS is identified. A system power cap is determined based on the power consumption profiles and the total available system power. A current power budget is determined for each node based on an analysis of at least one of the power consumption profile, the initial power budget, the current power consumption, the system power cap, and the total available system power. A power subsystem regulates power budgeted and supplied to each node based on the power consumption profiles and the system power cap.

20 Claims, 12 Drawing Sheets

Node Power Consumption History Table 422

| Node | T1  | T2  | T3  | T4  | T5  |
|------|-----|-----|-----|-----|-----|
| 164A | 322 | 316 | 278 | 305 | 264 |
| 164B | 280 | 180 | 358 | 288 | 235 |
| 164C | 340 | 198 | 377 | 222 | 302 |
| 164D | 277 | 261 | 228 | 316 | 253 |

FIG. 4D

PREDICTIVE POWER CAPPING AND POWER ALLOCATION TO COMPUTING NODES IN A RACK-BASED INFORMATION HANDLING SYSTEM

BACKGROUND

1. Technical Field

The present disclosure generally relates to information handling systems and in particular to rack-level predictive power capping and power budget allocation to processing nodes in a rack-based information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Providing power management and cooling to an information handling system is important to prevent loss of data and to maintain system reliability. During operation of an information handling system, events can occur that interrupt or reduce the amount of incoming AC power to the information handling system or the amount of available power from power supplies that deliver electrical power to the information handling system. Also, the processing components that consume power from the power supplies can modify their consumption of power to consume more or less power from one power-usage period to another. It is desirable for the information handling system to be able to seamlessly manage both increases and decreases in power demands from the components of the information handling system and to be able to manage interruptions in the delivery of power to the information handling system.

BRIEF SUMMARY

Disclosed are a computer-implemented method and a rack-based information handling system (IHS) that enables rack-level predictive power capping and power budget allocation to processing nodes in a rack-based IHS and enables selective turning on and off of power supplies based on actual power usage across the rack-based IHS.

According to one embodiment, the method comprises receiving, at a rack-level management controller from a plurality of block controllers, node-level power-usage data and settings, including current power consumption and an initial power budget, for each processing node within the IHS. The method further includes the management controller generating a power consumption profile based on the power-usage data for each of the processing nodes. The management controller further identifies a total available system power of the IHS, and determines a system power cap for the IHS, based on the power consumption profiles and the total available system power. The management controller further determines a current power budget for each of the processing nodes, based on an analysis of at least one of the power consumption profile, the initial power budget, the current power consumption, the system power cap, and the total available system power. A power subsystem of the IHS is triggered to regulate an amount of power budgeted and supplied to each of the processing nodes of the IHS based on the power consumption profiles and the system power cap.

Also disclosed is a rack-based information handling system that comprises one or more blocks within a rack structure. The blocks have at least one block controller and each of the blocks have one or more functional components including one or more processing nodes. The block controllers each control block-level operations of the processing nodes within a corresponding block. A rack-level management controller has a processor and a memory coupled to the processor. The rack-level management controller is communicatively coupled to the block controllers and indirectly to the processing nodes via the block controllers. A power subsystem includes a power controller that is communicatively coupled to the rack-level management controller and the power subsystem provides power distribution to a plurality of the functional component of the IHS. The rack-level management controller has firmware executing thereon to enable rack level predictive power allocation in a rack-configured IHS. The firmware configures the rack-level management controller to: receive a plurality of node-level power-usage data and settings from a plurality of block controllers, including a current power consumption and, when previously assigned, an initial power budget, for each processing node within the IHS; generate a power consumption profile based on the power-usage data for each of the processing nodes; identify a total available system power of the IHS; determine a system power cap for the IHS based on the power consumption profiles and the total available system power; determine a current power budget for each of the processing nodes based on an analysis of at least one of the power consumption profile, the initial power budget, the current power consumption, the system power cap, and the total available system power; and trigger a power subsystem of the IHS to regulate an amount of power budgeted and supplied to each of the processing nodes of the IHS based on the power consumption profiles and the system power cap.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 4D is a block diagram illustrating an example power consumption history table, in accordance with one embodiment;

DETAILED DESCRIPTION

Figure 1:
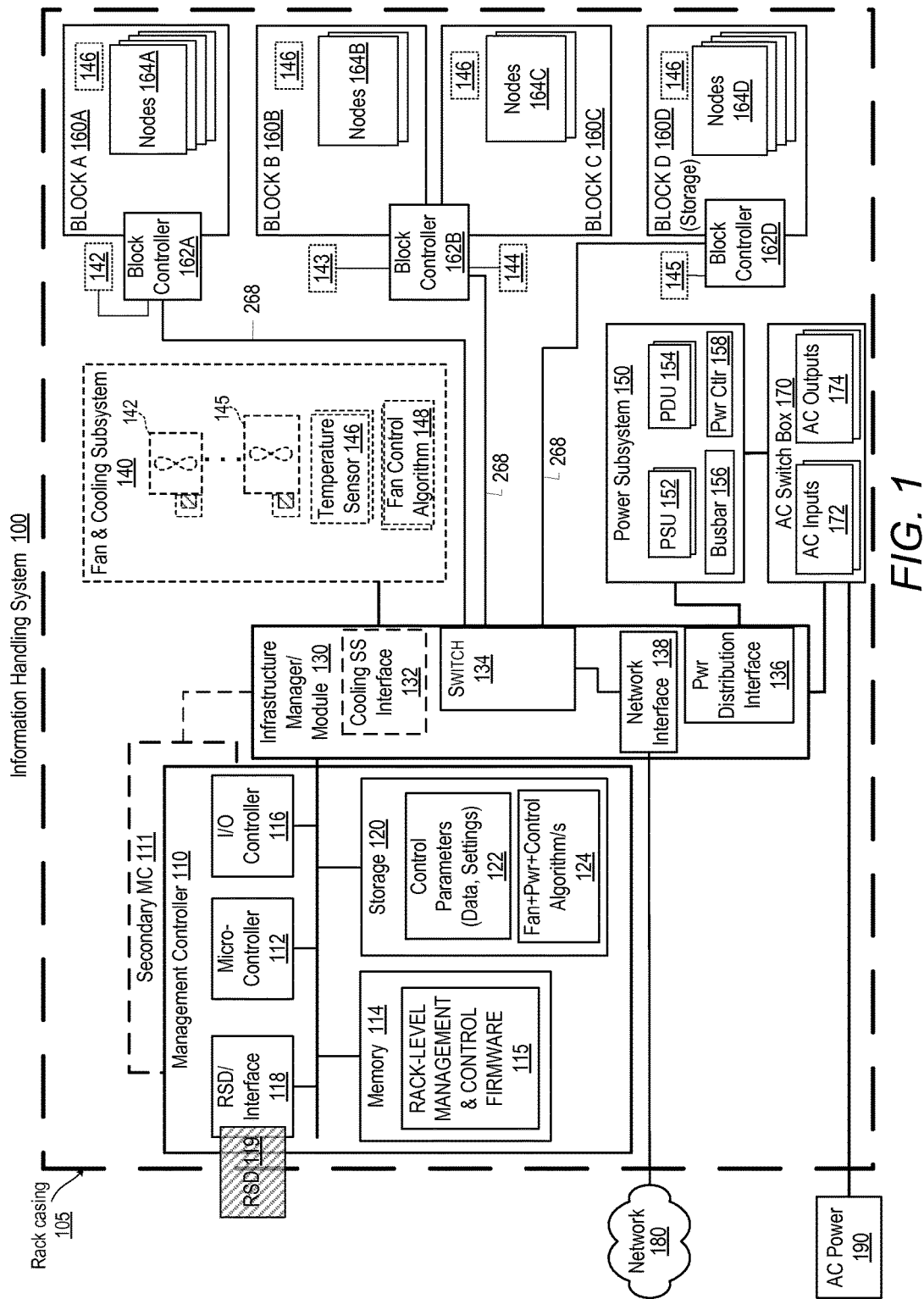
FIG. 1 is a block diagram illustration of an example modular, scalable and expandable (MSE) rack-based information handling system (RIHS), according to one or more embodiments.

The illustrative embodiments provide a rack-based information handling system (IHS) and a method performed within the IHS that enables rack-level predictive power capping and power budget allocation to processing nodes in a rack-based IHS and selective turning on and off of power supplies based on actual power usage across the rack-based IHS.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Further, those of ordinary skill in the art will appreciate that the hardware components and basic configuration depicted in the various figures (e.g. FIG. 1) and described herein may vary. For example, the illustrative components within IHS 100 (FIG. 1) are not intended to be exhaustive, but rather are representative to highlight components that can be utilized to implement various aspects of the present disclosure. For example, other devices/components/modules may be used in addition to or in place of the hardware and software modules depicted. The depicted examples do not convey or imply any architectural or other limitations with respect to the presently described embodiments and/or the general disclosure.

The description of the present disclosure that follows is arranged in two sections. Section A describes the general power system and hardware components of a rack-based information handling system. Section B describes a rack-level predictive power capping and power budget allocation to processing nodes in a rack-based information handling system.

Section A: Rack-Based Information Handling System

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, there is illustrated a two-dimensional block diagram of an example rack-based IHS 100 configured within a modular, expandable rack with modular configuration of various functional components inserted therein. As a two-dimensional image, certain of the presented components are shown in different orientations relative to each other for simplicity in describing the connectivity of the components. For example, while certain components are shown separate from the power subsystem, in actual implementation, these components can be located on or within a power bay housing several of the components of the power subsystem. Similarly, while the power subsystem is shown with specific components within a single block, these components are not necessarily contained in a unitary structure. For example, the bus bar can be modularly extended along the entire vertical run of the rack with only one sub-section in direct connection with or located within or proximate to the actual power bay. For purposes of the disclosure, all general references to an information handling system shall refer to the MSE rack-based IHS 100, while references to actual processing nodes within the IHS 100 are understood to refer to chassis-level processing nodes or other IT gear that can be located on physical sleds within the various blocks defined within the rack. It is further appreciated that within the MSE rack-based IHS 100 can be multiple, separate domains or computing systems that operate independent of each other and can be assigned to different independent customers and/or users. Even when configured as separate computing systems, however, the rack-based IHS provides rack-level power management and control of these systems as a unitary IHS. The level of detail of the actual use of the processing nodes within the general rack-level IHS 100 is not relevant to the descriptions provided herein and are specifically omitted.

As presented in FIG. 1, IHS 100 comprises rack casing 105, which can comprise one or more panels of sheet metal or other material interconnected to form a three dimensional shape that encloses a volume, generally referred to in the industry as a rack. The various components are communicatively connected to one or more other components via power and communication cables, which are generally represented by the connecting lines of FIG. 1. IHS 100 comprises a hierarchical arrangement of multiple management modules, along with power and cooling components, and functional processing components or IT gear located within end nodes. At the rack level, IHS 100 includes management controller (MC) 110 communicatively connected to infrastructure manager (IM) 130. MC 110 includes a microcontroller 112 (also generally referred to as a processor) which is coupled via an internal bus to memory 114, I/O interface controller 116, removable storage device (RSD) interface 118 and storage 120. Memory 114 can be flash or other form of memory. Illustrated within memory 114 is rack-level power management and control (RPMC or PMC) firmware 115, which is inclusive of the firmware that controls the operation of MC 110 in communicating with and managing the down-stream components (i.e., blocks and processing nodes, etc.) of IHS 100. I/O interface 116 provides connection points and hardware and firmware components that allow for user interfacing with the MC 110 via one or more connected I/O devices, such as a keyboard, a mouse, and a monitor. I/O interface 116 enables a user to enter commands via, for example, a command line interface (CLI), and to view status information of IHS 100. I/O interface 116 also enables the setting of operating parameters for IHS 100, among other supported user inputs.

RSD interface 118 enables insertion or connection of a RSD 119, such as an SD card containing pre-programmable operating firmware for IHS 100. In at least one embodiment, a RSD 119 stores a copy of the operating parameters of IHS 100 and the RSD 119 can be utilized to reboot the IHS 100 to its operating state following a system failure or maintenance shutdown. Storage 120 can be any form of persistent storage and can include different types of data and operating parameters (settings) 122 utilized for functional operation of IHS 100. Among the stored content within storage 120 can also be algorithms 124 for fan and/or power and/or control. In one or more embodiments, IHS 100 can optionally include at least one other MC, illustrated as second MC 111, to provide a redundant configuration of MCs 110,111, which, in one embodiment, are both simultaneously active and functioning. With this embodiment, the redundant configuration and parallel operation of MCs 110/111 enables IHS 100 to continue operating following a failure of either of the MCs 110/111 or in the event one of the MCs 110/111 has to be taken offline for maintenance.

Infrastructure manager (IM) 130 includes cooling subsystem interface 132, Ethernet switch 134, power distribution interface 136 and network interface 138. Network interface 138 enables IHS 100 and specifically the components within IHS 100 to connect to and communicate with or via an external network 180.

In addition to the above-described MC 110 and IM 130, IHS 100 further comprises fan and cooling subsystem 140, power subsystem 150, and a plurality of blocks 160, individually labeled as blocks A-D 160A-160D. In one implementation, each block 160 has an associated block controller (BC) 162. Cooling subsystem 140 includes a plurality of fan modules of which a first fan module 142 and a second fan module 145 are shown. These fan modules 142-145 are located within a respective fan bay (not shown) and can be different sizes and provide different numbers of fans per module. Also included within cooling subsystem 140 is a plurality of temperature sensors 146, which are further shown distributed within or associated with specific blocks 160. Cooling subsystem 140 of IHS 100 further includes some design features of rack casing 105, such as perforations for air flow and other design features not expanded upon within the present description. Each fan module 142-145 is located behind (or in the air flow path of) a specific block 160 and the fan module 142-145 is communicatively coupled to and controlled by the block controller 162 associated with that block 160. Within each block 160 is at least one, and likely a plurality of processing nodes 164. As one aspect of the disclosure, the number of nodes that can be placed within each block and/or supported by a single block controller can vary up to a maximum number (e.g., 16) based on the block dimension relative to the size and configuration of each processing node. Additionally, as provided by block D 160D, one or more of the blocks can be utilized to provide rack-storage of storage devices. Also, as shown with blocks B 160B and C 160C, a single block controller 162B can be assigned to control multiple blocks, when the number of processing nodes within an individual block does not exceed the pre-established BC threshold. In at least one implementation, the BC threshold can be set to 16 nodes. Each node controlled by a respective BC 162 is communicatively coupled to the BC 162 via one or more cables (not shown).

Switch 134 enables MC 110 to communicate with block controllers 162 via a network of Ethernet cables 268. Specifically, according to at least one embodiment, MC 110 provides certain control and/or management signals to BCs 162 via one or more select wires within the Ethernet cables 268, which select wires are one or more of the additional wires within the Ethernet cable that are not utilized for general system and network communication.

Power subsystem 150 generally includes a plurality of power supply units (PSUs) 152, one or more power distribution units (PDUs) 154, and a modular busbar 156. Power subsystem 150 also includes a source of external power, assumed to be AC power 190. Each of the individual nodes and other components within IHS 100 that require power are either directly coupled to modular busbar 156 or coupled via power cables to PDUs 154 to obtain power. As one aspect of power distribution within IHS 100, MC 110 can monitor power consumption across the IHS 100 as well as the amount of available power provided by the functional PSUs 152 and MC 110 can trigger changes in power consumption at the block level and ultimately at the (processing) node level based on changes in the amount of available power and other factors. Control of the power subsystem 150 can, in one embodiment, be provided by a separate power controller 158, separate from MC 110. As further illustrated, one additional aspect of the power system for the MSE rack-based IHS 100 provide for the inclusion of AC switch box 170. AC switch box 170 is communicatively coupled to both IM 130 and power subsystem 150. AC switch box 170 includes a plurality of AC inputs 172 and a plurality of AC outlets 174 that are utilized to supply power to the PSUs 152, and other functional components of MSE RIHS 100 that require AC power. Other features and functionality of IHS 100 will be described in greater detail hereafter with reference to one or more of the following figures.

Figure 2:
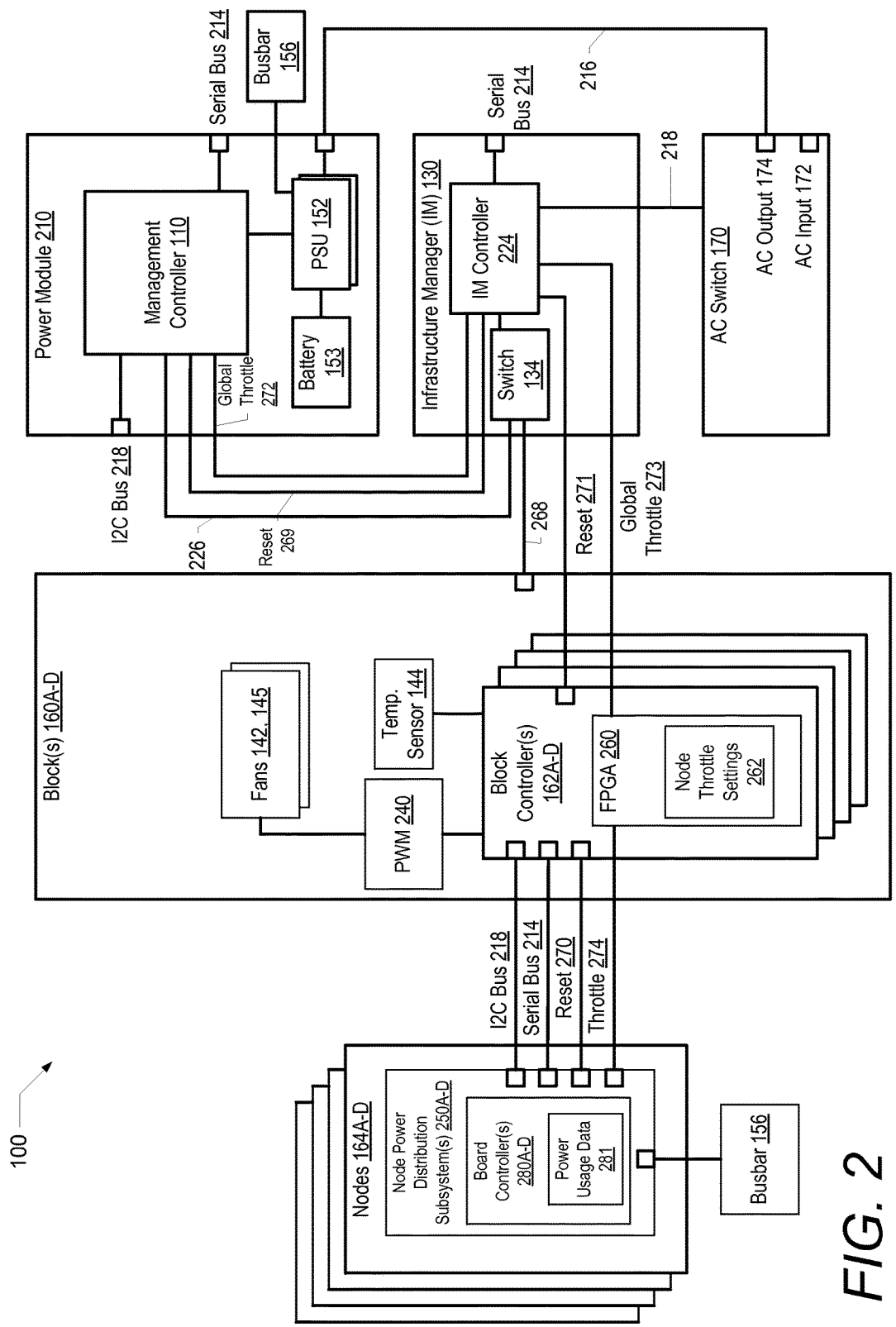
FIG. 2 is a block diagram illustrating the connectivity of components within the rack-based information handling system to implement global throttling of processing components/nodes via an associated block controller to reduce power consumption by at least one of the nodes, in accordance with one embodiment.

FIG. 2 illustrates further details of the connectivity of functional components within IHS 100 to implement a global throttling of power usage by the overall system. According to the described embodiments, global throttling can be achieved by dynamically and/or autonomously triggering a reduction in power consumption by at least one of the nodes via a global throttle command signal sent from the MC 110 to an associated block controller 162. Referring specifically to FIG. 2, IHS 100 comprises a power module 210 that includes management controller (MC) 110 communicatively connected to one or more PSUs 152. MC 110 can receive power supply data and settings from PSUs 152. PSUs 152 are connected to an AC power terminal and cable 216 that provides a source of AC power to PSUs 152. A backup battery 153 is connected to PSUs 152 to supply backup system power in case of a loss of primary power (e.g., AC power cable 216) to IHS 100. An AC switch box 170 supplies switched AC power to IHS 100. AC switch box 170 has an AC input terminal 172 and an AC output terminal 174 An AC power cable 216 is connected between and supplies AC power from AC switch box 170 to PSUs 152.

MC 110 is communicatively connected to a serial bus 214 and an I2C bus 218. An Ethernet cable 226 is communicatively connected between MC 110 and switch 134 of infrastructure manager (IM) 130. Ethernet cable 226 comprises a plurality of individual wires (e.g., 8 wires) on which a different communication or signal can be routed. In one embodiment, Ethernet cable 226 can be a category 5 cable that has 8 wires arranged in 4 twisted pairs. Each of the twisted pairs has a signal wire and a ground wire that is wound around the signal wire. The ground wire reduces cross-talk noise and increases the transmission speed of electrical signals carried by Ethernet cable 226. In another embodiment, Ethernet cable 226 can contain more or less than 8 total wires. According to one aspect of the disclosure, at least one of the wires in the Ethernet cable 226 is assigned as a global throttle wire 272 to provide communication of a global throttle power reduction (GTPR) signal from the rack-level management controller 110 to the IM controller 224. In addition, in one or more embodiments and in accordance with another aspect of the disclosure, at least one other wire in the Ethernet cable 226 is assigned as a global reset wire 269 to allow for communication of a reset signal from the rack-level management controller 110 to the IM controller 224.

Infrastructure manager 130 comprises a switch 134 that is communicatively connected to IM controller 224. IM controller 224 is communicatively connected to an AC switch box 170 and to a serial bus 214. Another set of Ethernet cables 268 are communicatively connected between IM controller 224 and each of blocks 160A-D. Ethernet cables 268 each comprise a plurality of individual wires (e.g., 8 wires) on which a different communication or signal can be routed. In one embodiment, Ethernet cable 268 can be a category 5 cable that has 8 wires arranged in 4 twisted pairs. Each of the twisted pairs has a signal wire and a ground wire that is wound around the signal wire. The ground wire reduces cross-talk noise and increases the transmission speed of electrical signals carried by Ethernet cables 268. In another embodiment, Ethernet cables 268 can contain more than 8 total wires (e.g. 16 or 20 wires). According to one aspect of the disclosure, a subset (e.g., 2) of the individual signal wires within Ethernet cables 268 are assigned for general system and network communication between IM 130 (based in part on triggering commands received from MC 110) and BCs 162A-D. Additionally, at least one signal wire in each of Ethernet cables 268 is assigned as a global throttle wire 273 for a specific connected one of the block controllers 162A-D to provide communication of a GTPR signal from the IM controller 224 to the specific associated block controller 162A-D. In addition, at least one other signal wire in each of the Ethernet cables 268 is assigned as a global reset wire 271 for a specific connected one of the block controllers 162A-D to allow for expedient communication of a reset signal from the MC 110 via the IM controller 224 to the specific associated block controller 162A-D. While described as communications between the IM controller 224 and block controllers 162A-D, it is appreciated that the commands to perform global throttling or global resets are generated by the MC 110 and routed through the infrastructure manager 130 and specifically the IM controller 224. One aspect of the disclosure is an appreciation that to ensure effective operation of the information handling system 100 after a decrease in available power, it may be necessary to reduce the power requirements of one or more components of the information handling system 100. In particular, it may be necessary to reduce power consumption of processing nodes that consume high levels of power during normal operation.

Processing blocks 160A-D comprise BCs 162A-D, fan modules 142-145, pulse width modulation circuit (PWM) 240 and temperatures sensors 144. BCs 162A-D are communicatively connected to fan modules 142-145 via PWM 240. The cooling levels of fan modules 142-145 can be selectively regulated by PWM output signals produced by PWM 240. BCs 162A-D are also communicatively connected to temperature sensors 146. Each of BCs 162A-D contains a field programmable gate array (FPGA) 260 that contains pre-determined processing node global throttle data settings 262. Global throttle data settings 262 designate at least one of the processing nodes 164A-D to reduce power in response to a controlling BCs 162A-D receiving a GTPR signal communicated via first global throttle wire 272 and second global throttle wire 273. The second global throttle wires 273 are specifically connected to a respective FPGA 260 of BCs 162A-D.

Within each of blocks 160A-D are at least one, and likely a plurality of processing/functional nodes, such as nodes 164A-D, which are generally referred to herein as processing nodes. Each processing node 164A-D contains node power distribution subsystem(s) 250A-D that receives and controls power distributed to nodes 164A-D. Each of the node power distribution subsystems 250A-D is communicatively connected to a respective BC 162A-D by an I2C bus 218 and serial bus 214 for the transmission of general data and signals. Additionally, a reset wire 270 is communicatively connected between each of the node power distribution subsystems 250A-D and an associated BC 162A-D to enable communication of a reset signal from the associated BC 162A-D to the specific node 164A-D. A global throttle wire 274 is also communicatively connected between each of the node power distribution subsystems 250A-D and a respective FPGA 260 within BCs 162A-D to enable communication of a GTPR signal from the associated BCs 162A-D to the specific nodes 164A-D. Both reset wire 270 and global throttle wire 274 can be individual wires that are assigned within a same Ethernet cable connecting the MC 110 to a corresponding one of BCs 162A-D. Each of the node power distribution subsystems 250A-D are connected to modular power busbar 156 to receive power from PSUs 152. Each of the node power distribution subsystems 250A-D contains associated board controller(s) 280A-D that control the operations of a respective node power distribution subsystem(s) 250A-D. Board controller(s) 280A-D can track and record power usage data and settings 281 for each of the processing nodes 164A-D.

Figure 3:
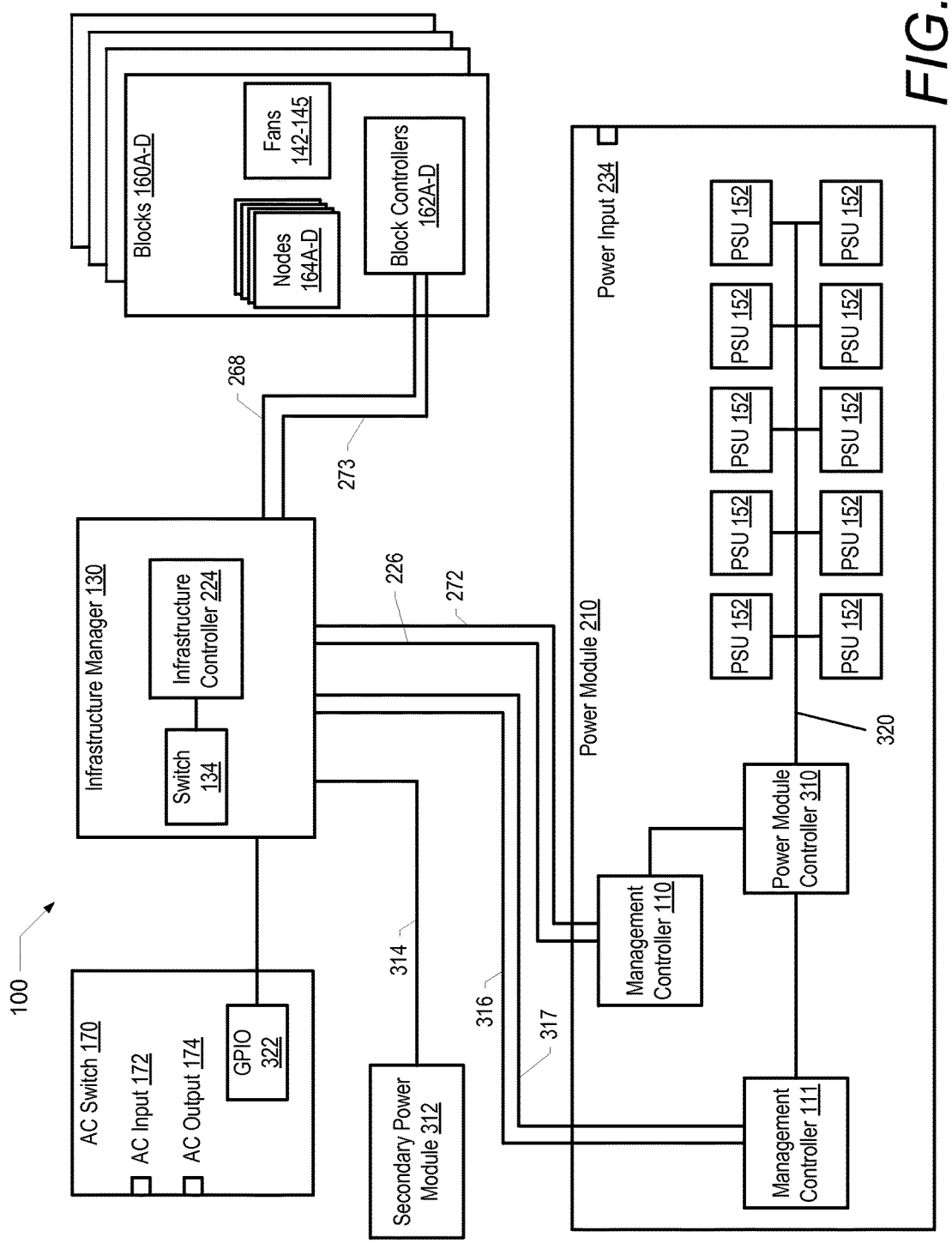
FIG. 3 is a block diagram further illustrating the connectivity of components within the rack-based information handling system and components of the power module, in accordance with one embodiment.

FIG. 3 illustrates further details of the connectivity of functional components within IHS 100 to implement a global throttling of power usage by the overall system. The global throttling is provided by dynamically and/or autonomously triggering a reduction in power consumption by at least one of the nodes via a global throttle command signal sent from the MCs 110, 111 to an associated block controller 162. Referring specifically to FIG. 3, IHS 100 comprises a power module 210 that includes a power controller (PC) 158 communicatively connected to each of ten PSUs 152. Power module 210 provides regulated power to IHS 100. While ten (10) PSUs 152 are shown, more or less PSUs 152 can be used within power module 210. PC 158 coordinates the operation, timing and communications of functional components within power module 210. PC 158 is further communicatively connected to MCs 110 and 111. MCs 110 and 111 can receive power supply data and settings from PSUs 152 via PC 158.

Power module 210 receives AC power from AC switch box 170 at AC power input terminal 234 that provides a source of AC power to PSUs 152. AC switch 170 has an AC input terminal 172 and an AC output terminal 174. AC switch box 170 has a general purpose input/output (GPIO) interface 322 that is communicatively connected to infrastructure manager 130.

MC 110 is communicatively connected to infrastructure manager 130 by Ethernet cable 226. At least one of the wires in the Ethernet cable 226 is allocated as a global throttle wire 272 to provide communication of a global throttle power reduction (GTPR) signal from the rack-level management controller 110 to the infrastructure manager 130. When IHS 100 also includes second MC 111, the second MC 111 is communicatively connected to infrastructure manager 130 by Ethernet cable 316. As with global throttle wire 272, at least one of the wires in the Ethernet cable 316 is allocated as a global throttle wire 317 to provide communication of a global throttle power reduction (GTPR) signal from the second rack-level management controller 111 to the infrastructure manager 130.

Infrastructure manager 130 comprises a switch 134 that is communicatively connected to infrastructure controller 224. Another set of Ethernet cables 268 are communicatively connected between infrastructure manager 130 and each of blocks 160A-D. Ethernet cables 268 each comprise a plurality of individual wires (e.g., 8 wires). According to one aspect of the disclosure, a subset (e.g., 4) of the individual wires within Ethernet cable 268 can be used for general system and network communication between IM 130 and BCs 162A-D. Additionally, at least one wire in Ethernet cables 268 is allocated for as a global throttle wire 273 for a specific connected one of the block controllers 162A-D to provide communication of a GTPR signal from the infrastructure controller 224 to the specific associated block controller 162A-D. Processing blocks 160A-D comprise BCs 162A-D, fan modules 142-145 and processing nodes 164A-D.

IHS 100 can optionally include at least one other secondary power module 312, to provide a redundant power module that in one embodiment, both simultaneously supplies and regulates power to IHS 100. The redundant configuration of power modules 210/312 enables IHS 100 to continue operating following a failure of either of the power modules 210/312 or in the event one of the power modules 210/312 is taken offline for maintenance.

Figure 4C:
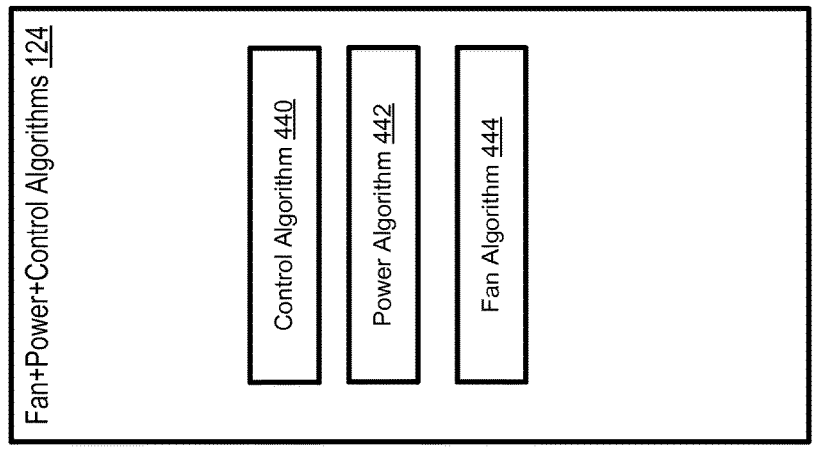
FIG. 4C is a block diagram illustrating examples of the stored fan, power and control algorithms, in accordance with one embodiment.
Figure 4B:
FIG. 4B is a block diagram illustrating example contents of the stored control parameters, in accordance with one embodiment.
Figure 4A:
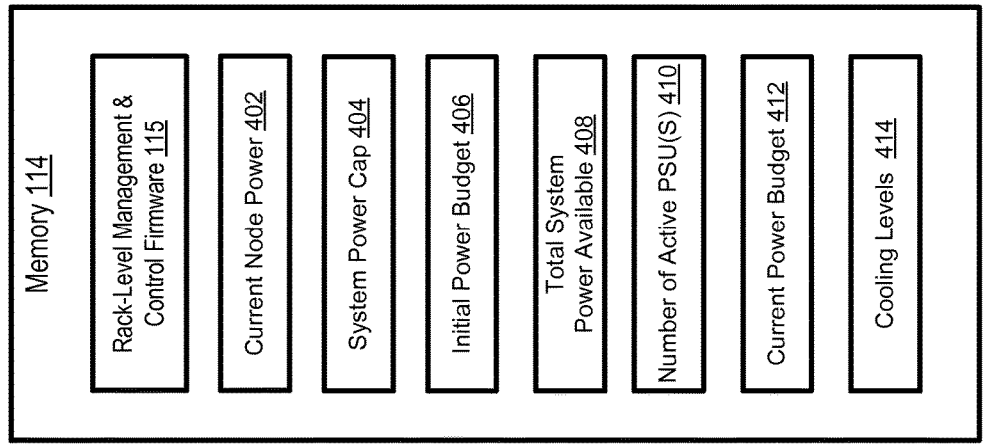
FIG. 4A is a block diagram illustrating example contents of the management controller memory, in accordance with one embodiment.

FIGS. 4A, 4B and 4C illustrate further details of the contents of management controller memory 114 and storage 120. With specific reference to FIG. 4A, management controller memory 114 can store rack-level management and control (RMC) firmware 115, which is inclusive of the firmware that controls the operation of MC 110 in communicating with and managing the down-stream components of IHS 100, such as BCs 162A-D. In the illustrative embodiment, management controller memory 114 stores current node power consumption 402 for each of the processing nodes 164, a system power cap 404 for the overall IHS 100, an initial power budget 406 for each of the processing nodes 164 within the various blocks 162A-D and a total system power available 408. Management controller memory 114 further stores data parameter values including (i) a total number of active PSU(s) 410, (ii) a current power budget 412 for each of the blocks 162A-D and optionally (iii) the current power budget for (iii) respective nodes 164A-D within each of the separate blocks 162A-D. Additionally, MC memory 114 maintains cooling levels 414 for the operation of fans 142-145.

FIG. 4B illustrates contents of control parameters 122 stored within MC storage 120. Control parameters 122 are used by MC 110 during rack-level power system control operations of IHS 100. Control parameters 122 can contain a node maximum power 420, which is the maximum amount of power that each node among nodes 164 can consume, and node power consumption history 422, which is a record of the power previously used during a pre-established most recent time period by each of nodes 164. Control parameters 122 also contain a system power cap threshold 424, a temperature threshold 426, and a backup battery power threshold 428. The system power cap threshold 424 is a pre-determined maximum amount of power that IHS 100 can consume before an action to reduce power consumption by one or more components within IHS is initiated. The temperature threshold 426 is the maximum temperature that IHS 100 can reach before an action to reduce power consumption is initiated to reduce the amount of heat dissipation from the system components. The backup battery power threshold 428 is the threshold level of backup battery power remaining in battery 153, when IHS 100 is consuming power from backup battery 153, before an action to reduce power consumption is initiated. Control parameters 122 further include a pre-established power budget adjustment time (PBAT) threshold 430 that is used to track whether to maintain a current power budget allocation for a node when a decrease in power consumption by that node is detected.

FIG. 4C illustrates a plurality of algorithms 124 for fan and/or power and/or control stored within MC storage 120. Algorithms 124 are used by MC 110 during rack-level power system control operations of IHS 100. Algorithms 124 include a control algorithm 440, one or more power algorithm/s 442, and one or more fan algorithm/s 444. Control algorithm 440, power algorithm/s 442, and fan algorithm/s 444 are used within rack-level management and control (RMC) firmware 115 by MC 110 to regulate an amount of power supplied to one or more of the processing nodes 164 of IHS 100 or an amount of power supplied to one or more fans to provide cooling required for the IHS.

FIG. 4D illustrates example contents of node power consumption history table 422. Node power consumption history table 422 is a record of the power previously used during a pre-established most recent time period by each of nodes 164 and the table is stored in MC storage 120. Node power consumption history table 422 includes the power consumption history for each individual node 164A-D during the pre-established most recent time periods T1-T5. In an illustrative embodiment, node 164A is shown as using or consuming 322 watts of power during time period T1, 316 watts of power during time period T2, 278 watts of power during time period T3, 305 watts of power during time period T4 and 264 watts of power during time period T5.

It is appreciated that while shown and described as components of MC 110, several of the above parameters and algorithms can be distributed throughout IHS 100 and not necessarily localized to MC 110 and MC memory or MC 114 storage 120. For example, the fan algorithms and cooling threshold parameters can be provided at/within the BCs 162A-D, such that block-level control of cooling can occur responsive to a detected rack-level overheating condition.

Figure 5:
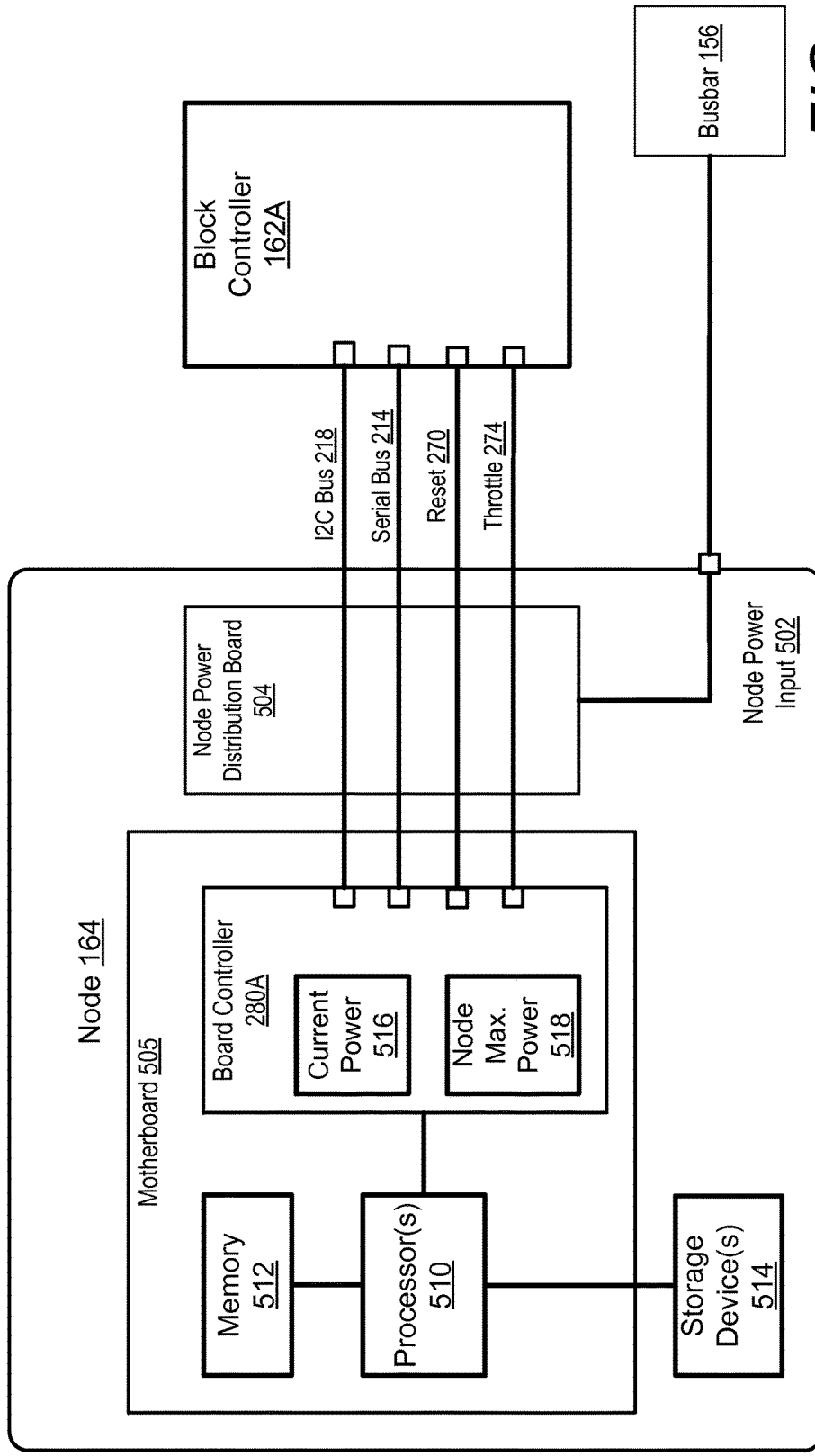
FIG. 5 is a block diagram illustrating example components of a processing node within the rack-based information handling system, in accordance with one embodiment.

With reference now to FIG. 5, there is illustrated one embodiment of a single processing node 164. In some embodiments, processing node 164 is sometimes called a sled, which generally represents the chassis on which the processing node 164 is built and which can be slid into and out of the front bay of the rack chassis. Processing node 164 has a power input terminal 502 that receives power from busbar 156. Power input terminal 502 is connected to a node power distribution board 504. Processing node 164 comprises a motherboard 505 that includes one or more processor(s) 510 communicatively connected to a local memory 512 and storage device(s) 514. Storage device(s) 514 can be utilized to store one or more software and/or firmware modules and/or data (not specifically shown). In one embodiment, storage device(s) 514 can be a hard drive or a solid state drive. It is also appreciated that in some embodiments, the "processing node" sled can actually be a storage device sled, hosting a large number of storage devices that are specifically configured to store mass amounts of data. Processor(s) 510 are also communicatively connected to a board controller 280A. In one embodiment, board controller 280A can reside on motherboard 505 that also contains processor(s) 510. Board controller 280A can contain non-volatile memory and/or firmware that contains data about the current power 516 being drawn or consumed by processing node 164 and the maximum power 518 that processing node 164 can draw or consume.

Board controller 280A is communicatively connected to BC 162A by an I2C bus 218 and by a serial bus 214 that are connected via node power distribution board 504. Global throttle wire 274 and reset wire 270 are also communicatively connected between BC 162A and board controller 280A by conductors that are routed through node power distribution board 504. In one embodiment, board controller 280A can be omitted and I2C bus 218, serial bus 214, global throttle wire 274 and reset wire 270 can be directly connected to motherboard 505. Global throttle wire 274 enables communication of a GTPR signal from the BC 162A to board controller 280A. Upon receipt of the GTPR signal, board controller 280A triggers at least one of the components of processing node 164 to reduce a current amount of power being consumed. In one embodiment, receipt of the GTPR signal triggers processor(s) 510 to reduce processing speed and/or enter a lower power operating state. In another embodiment, receipt of the GTPR signal triggers storage device(s) 514 to enter a lower power operating state.

Section B: Rack-Level Predictive Power Capping and Power Budget Allocation in a Rack-Based Information Handling System FIGS. 6-11 illustrate flowcharts of exemplary methods by which rack-level management controller 110 within the preceding figures performs different aspects of the processes that enable the one or more embodiments of the disclosure. Generally, methods 600, 700, 800, 900, 1000 and 1100 collectively represent computer-implemented methods. The description of each method is provided with general reference to the specific components illustrated within the preceding FIGS. 1-5. Generally each method is described as being implemented via rack-level management controller 110 and particularly the execution of code provided by rack-level management and control (RMC) firmware 115 within micro-controller (or processor) 112. The execution of this RMC firmware 115 results in the implementation of rack-level predictive power capping and power budget allocation to processing nodes in a rack-based IHS 100. It is however appreciated that certain aspects of the described methods may be implemented via other processing devices and/or execution of other code. Also, each different block represented in the flow charts is referred to as a step (e.g., step xyz), with the understanding that the overall method can involve several of the processes from these blocks operating together, in sequence or concurrently with each other or in a different order relative to each other to perform a specific function.

Figure 6:
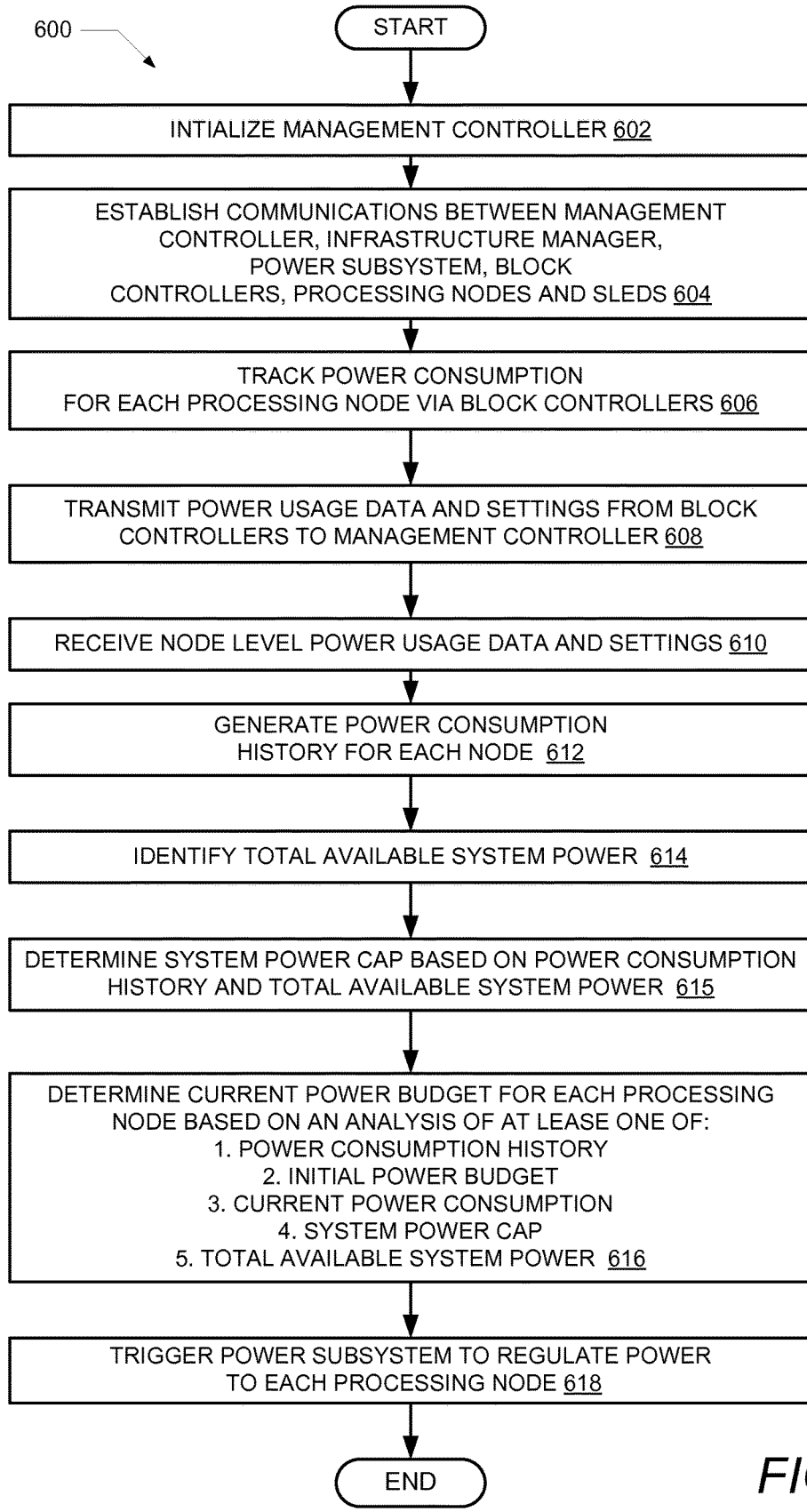
FIG. 6 is a flow chart illustrating one example of the method by which rack-level predictive power allocation to processing nodes is performed within a rack-based information handling system, according to one or more embodiments.

With specific reference to FIG. 6, method 600 illustrates a step for rack-level predictive power capping and power budget allocation to processing nodes in a rack-based IHS. Method 600 begins at the start block and proceeds to step 602 where MC 110 is initialized. The initialization of MC 110 includes microcontroller 112 loading RMC firmware 115 and loading at least one of the control parameters 122 and/or fan and/or power and/or control algorithms 124. At step 604, MC 110 establishes communications with infrastructure manager 130, fan and cooling subsystem 140, temperature sensors 144, power subsystem 150, blocks 160A-D, block controllers 162A-D and processing nodes 164A-D. The block controllers 162A-D track the power-usage data and settings 281 for each of the processing nodes within an associated block (step 606). The block controllers 162A-D transmit the power-usage data and settings 281 from the block controllers 162A-D to MC 110 (step 608).

MC 110 receives power usage data and settings 281 for each of the processing nodes 164A-D (step 610). MC 110 generates a power consumption profile or history table 422 for each individual node 164A-D during the pre-established most recent time periods T1-T5, and MC 110 stores the power consumption history table 422 in MC storage 120 (step 612). At step 614, MC 110 identifies a total available system power 408 of the IHS 100. MC 110 determines a system power cap 404 for the IHS 100 based on the power consumption history table 422 and the total available system power 408 (step 615). MC 110 determines a current power budget 412 for each of the processing nodes 164 based on an analysis of at least one of the power consumption history 422, the initial power budget 406, the current power consumption 402, the system power cap 404, and the total available system power 408 (step 616). MC 110 triggers the power subsystem 150 of the IHS 100 to regulate an amount of power budgeted and supplied to each of the processing nodes 164 of the IHS 100 based on the power consumption profiles 422 and the system power cap 404 (step 618). Step 618 includes the block controllers 162 regulating an amount of power budgeted and supplied within an associated block. Method 600 then ends.

Figure 7:
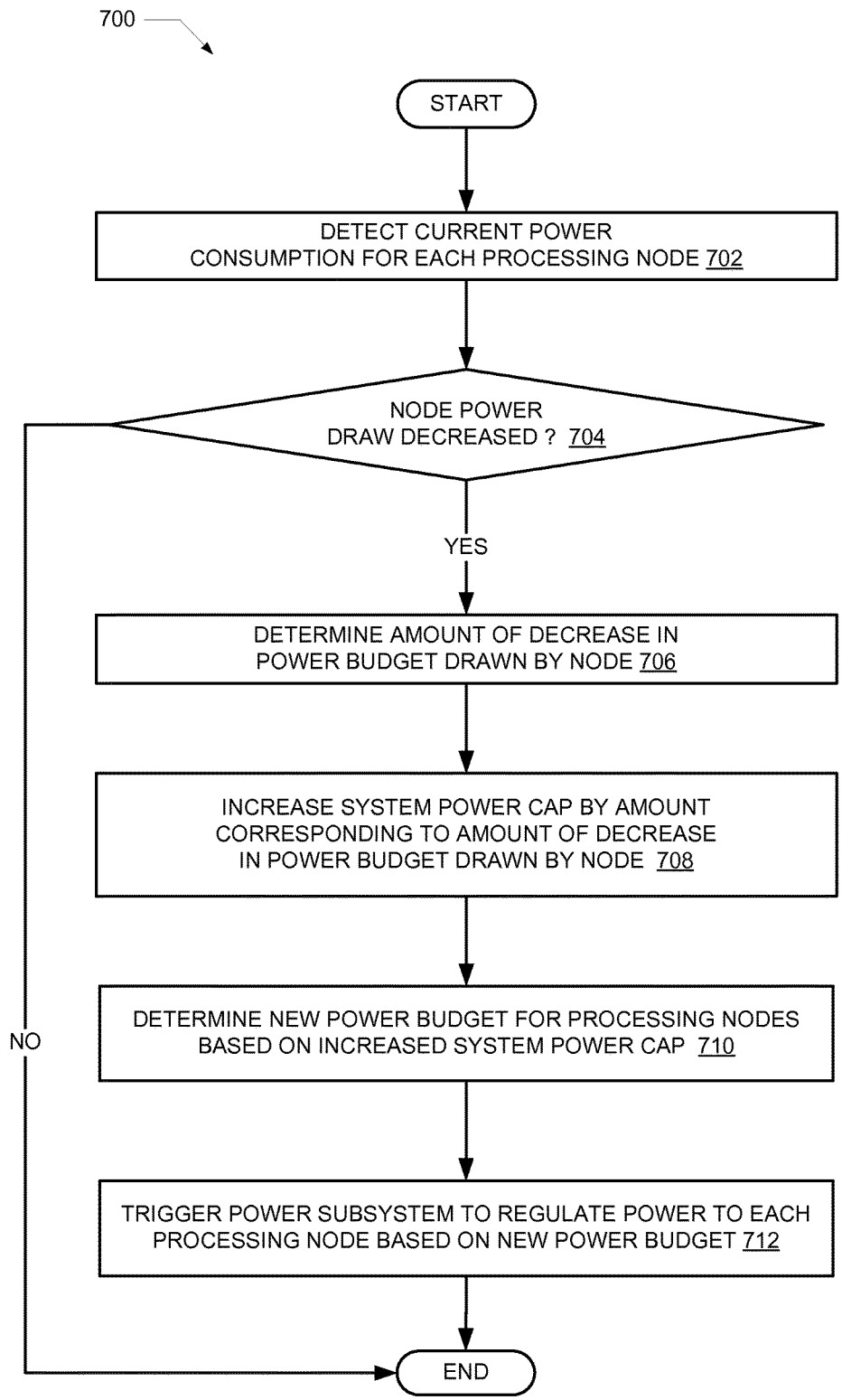
FIG. 7 is a flow chart illustrating one example of the method by which the power budget is increased in the event of a decrease in power demand by one or more processing nodes, according to one or more embodiments.

Turning now to FIG. 7, a flow chart illustrating an example method 700 is shown to enable an increase in the system power cap and current power budget in the event of a decrease in power demand by one or more processing nodes. Method 700 begins at step 702 where MC 110 detects or receives (from respective BCs 162) the current node power consumption 402 by the processing nodes 164. MC 110 determines if a decrease in the current power consumption lasting more than a preset threshold amount of time (i.e., a power budget rebalance triggering (PBRT) decrease) has occurred for any of the processing nodes 164 (decision step 704). In response to determining that a PBRT decrease in the current power consumption has not occurred for one or more of the processing nodes 164, method 700 ends. In response to determining that a PBRT decrease in the current power consumption has occurred for one or more of the processing nodes 164, MC 110 determines the amount of the PBRT decrease in the current power budget 412 for the corresponding processing nodes (step 706) and increases the available amount of power within the system power cap 404 by an amount corresponding to the decrease in the current power budget for the corresponding processing nodes (step 708). At step 710, MC 110 determines a new power budget 412 to allocate to one or more of the processing nodes based on the increase in the available amount of power within the system power cap 404. MC 110 triggers the power subsystem 150 to regulate and provide the new power budget 412 to each of the processing nodes 164 (step 712). Method 700 then terminates.

Figure 8:
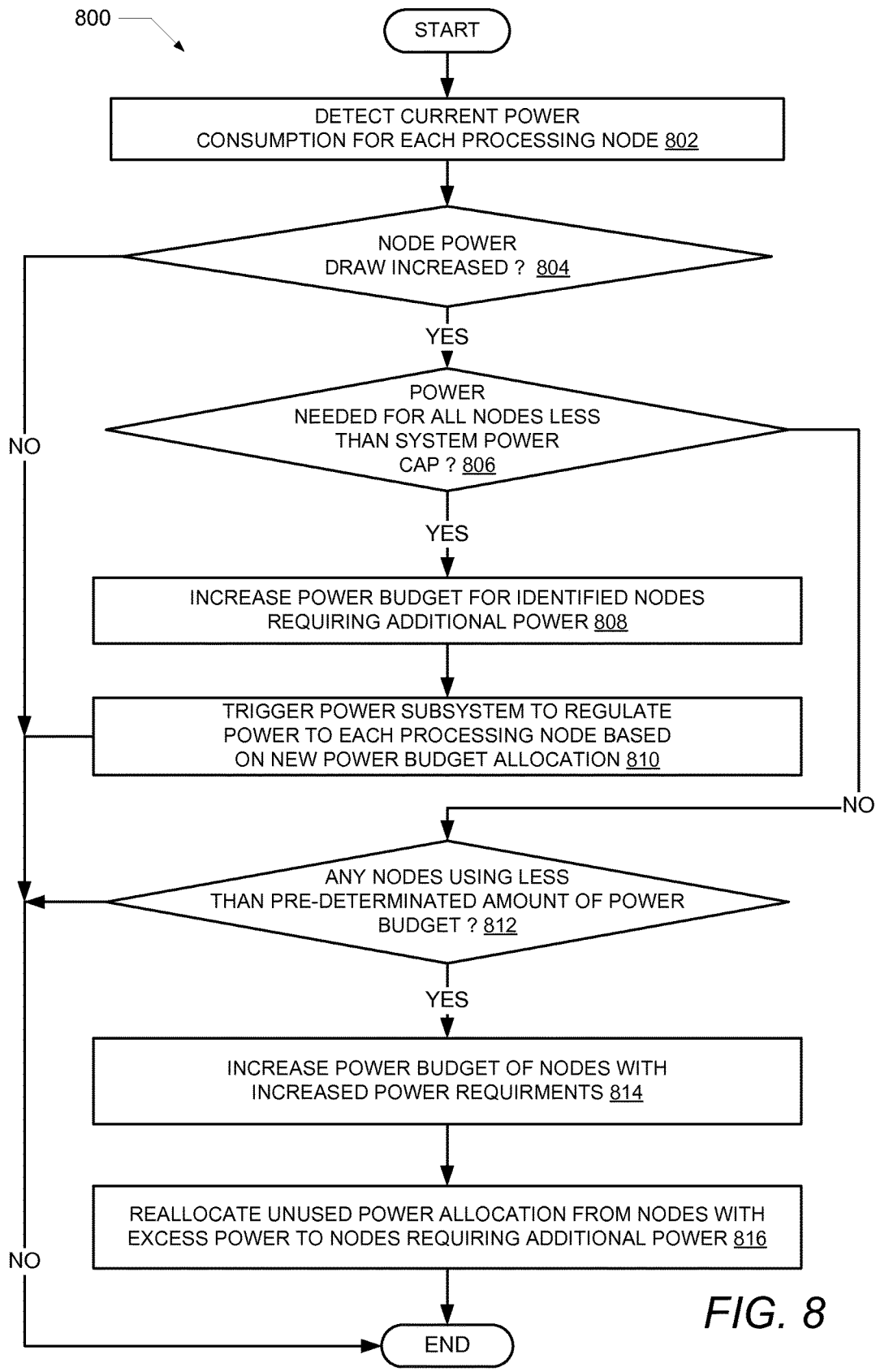
FIG. 8 is a flow chart illustrating one example of the method by which power is allocated to processing nodes in the event of an increase in power demand, according to one or more embodiments.

FIG. 8 illustrates a flow chart of a method to budget power allocation to processing nodes in the event of an increase in power demand. Method 800 begins at step 802 where MC 110 detects the current node power consumption 402 by the processing nodes 164. MC 110 determines if an increase in the current power consumption has occurred for any of the processing nodes 164, which increase indicates that the processing node requires a higher allocation of power budget than is currently allocated (step 804). In one or more embodiments, this increase must be more than a single spike in power consumption by the processing nodes 164 and may involve continuous or frequent power consumption at the established power budget for the processing nodes 164 over some pre-established minimum time period. In response to determining that an increase in the current power consumption has not occurred for one or more of the processing nodes 164, method 800 ends. In response to determining that an increase in the current power consumption has occurred for one or more of the processing nodes 164, MC 110 determines if the required power to operate all of the processing nodes at current power consumption levels is less than a system power cap threshold 424 (decision step 806). In response to determining that the current power consumption by all of the processing nodes 164 is less than the system power cap threshold 424, MC 110 increases the current power budget 412 for the identified processing nodes to a new power budget (step 808) and triggers power subsystem 150 to provide a corresponding increase in the power budget to the identified processing nodes and re-adjusts the power budget allocation across the IHS 100 based on the new power budget (step 810). Method 800 then ends.

In response to determining that the current power consumption by all of the processing nodes is not less than the system power cap threshold 424 (step 806), MC 110 determines if any of the other processing nodes 164 are using less than a pre-determined amount (e.g., 65%) of their current power budget allocation over a time period spanning a minimum pre-established most recent consumption period (decision step 812). In response to determining that none of the processing nodes are using less than the pre-determined amount of their current power budget allocation over a minimum established period of time, method 800 ends, and no adjustment of power budget allocation is made. In response to determining that at least one of the processing nodes 164 are using less than the pre-determined amount of their current power budget allocation over a minimum established period of time, MC 110 increases the current power budget 412 of the processing nodes identified as requiring increased power to create a new power budget (step 814). At step 816, MC 110 re-apportions unused power from the nodes not using all of their current power budget to processing nodes identified as requiring increased power to provide a new higher power budget allocation to the processing nodes identified as requiring increased power. Method 800 then terminates.

Figure 9:
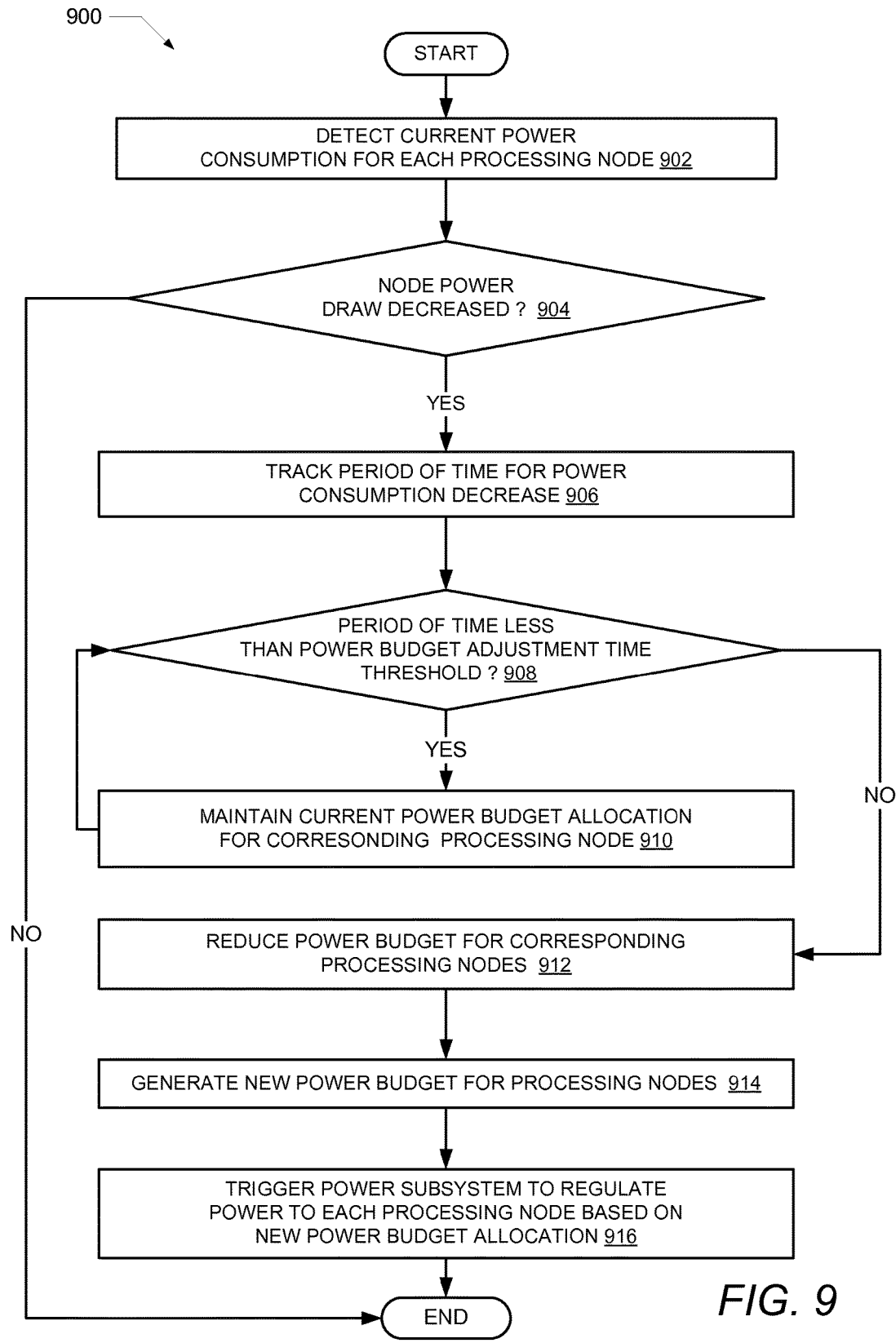
FIG. 9 is a flow chart illustrating one example of the method by which power is allocated to a processing node in the event of a decrease in power demand, according to one or more embodiments.

FIG. 9 illustrates a flow chart of a method to allocate power to processing nodes in the event of a decrease in power demand. Method 900 begins at block 902 where MC 110 detects the current node power consumption 402 by the processing nodes 164. MC 110 determines or identifies whether a decrease in the current power consumption has occurred for any of the processing nodes 164 (decision step 904). In response to determining that a decrease in the current power consumption has not occurred for one or more of the processing nodes 164, method 900 ends. In response to determining that a decrease in the current power consumption has occurred for one or more of the processing nodes 164, MC 110 monitors or tracks a period of time over which the decrease in the power consumption occurs (step 906). At decision step 908, MC 110 determines whether the period of time during which the decrease in the power consumption occurs is less than or does not exceed a pre-established power budget adjustment time (PBAT) threshold 430.

In response to the period of time being less than or not exceeding the PBAT threshold 430, MC 110 maintains the current power budget 412 allocated to the corresponding processing nodes (step 910) and then returns to step 908, where MC 110 continues to determine whether the period of time during which the decrease in the power consumption occurs is less than or does not exceed a pre-established power budget adjustment time (PBAT) threshold 430. In response to the period of time not being less than (i.e., exceeding) the PBAT threshold 430, MC 110 reduces a value of the current power budget 412 of the corresponding processing nodes (step 912) and generates a new power budget (step 914). MC 110 triggers the power subsystem 150 to regulate the power allocated to each of the processing nodes based on the new power budget (step 916). Method 900 then ends.

Figure 10:
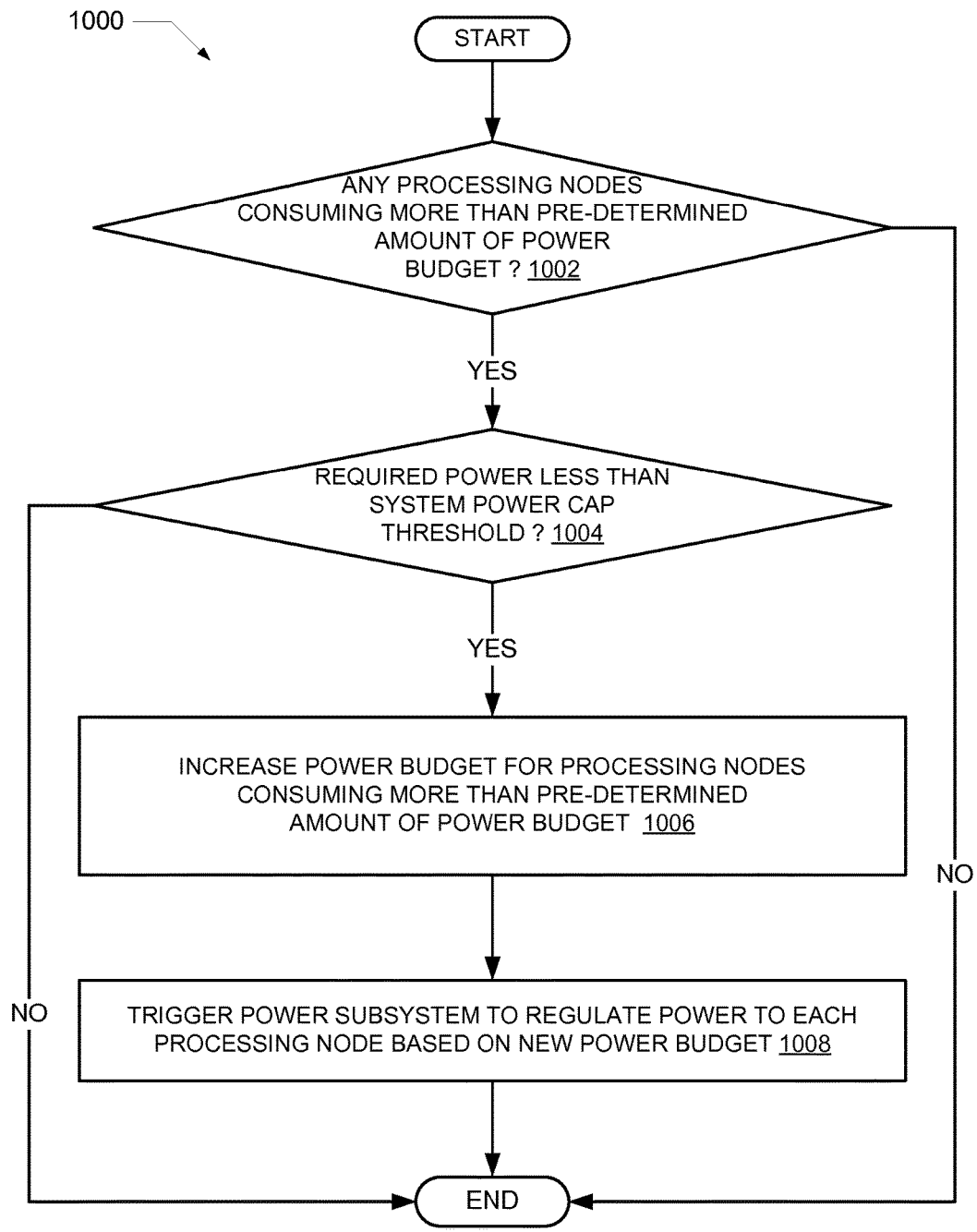
FIG. 10 is a flow chart illustrating one example of the method by which power allocation is increased to processing nodes that use larger amounts of power, according to one or more embodiments.

FIG. 10 illustrates a flow chart of a method to increase power allocated to processing nodes that use larger amounts of power. Method 1000 begins at the start block and proceeds to decision step 1002 where MC 110 determines whether any processing nodes 164 are consuming more than a pre-determined amount of their corresponding current power budget 412. In response to determining that none of the processing nodes 164 are consuming more than a pre-determined amount of their corresponding current power budget 412, method 1000 ends. In response to determining that one or more of the processing nodes 164 are consuming more than a pre-determined amount (e.g., 95%) of their corresponding current power budget 412, MC 110 determines if the required power to operate all of the processing nodes at current power consumption levels is less than a system power cap threshold 424 (decision step 1004). In response to determining that the current power consumption by all of the processing nodes is not less than the system power cap threshold 424, method 1000 terminates. In response to determining that the current power consumption by all of the processing nodes is less than the system power cap threshold 424, MC 110 increases the current power budget 412 for the identified processing nodes using more than the pre-determined amount of their power budget (step 1006) and triggers power subsystem 150 to provide a corresponding increase in the power budget to the identified processing nodes and re-adjusts the power budget allocation across the IHS 100 based on the new power budget (step 1008). Method 1000 then ends.

Figure 11:
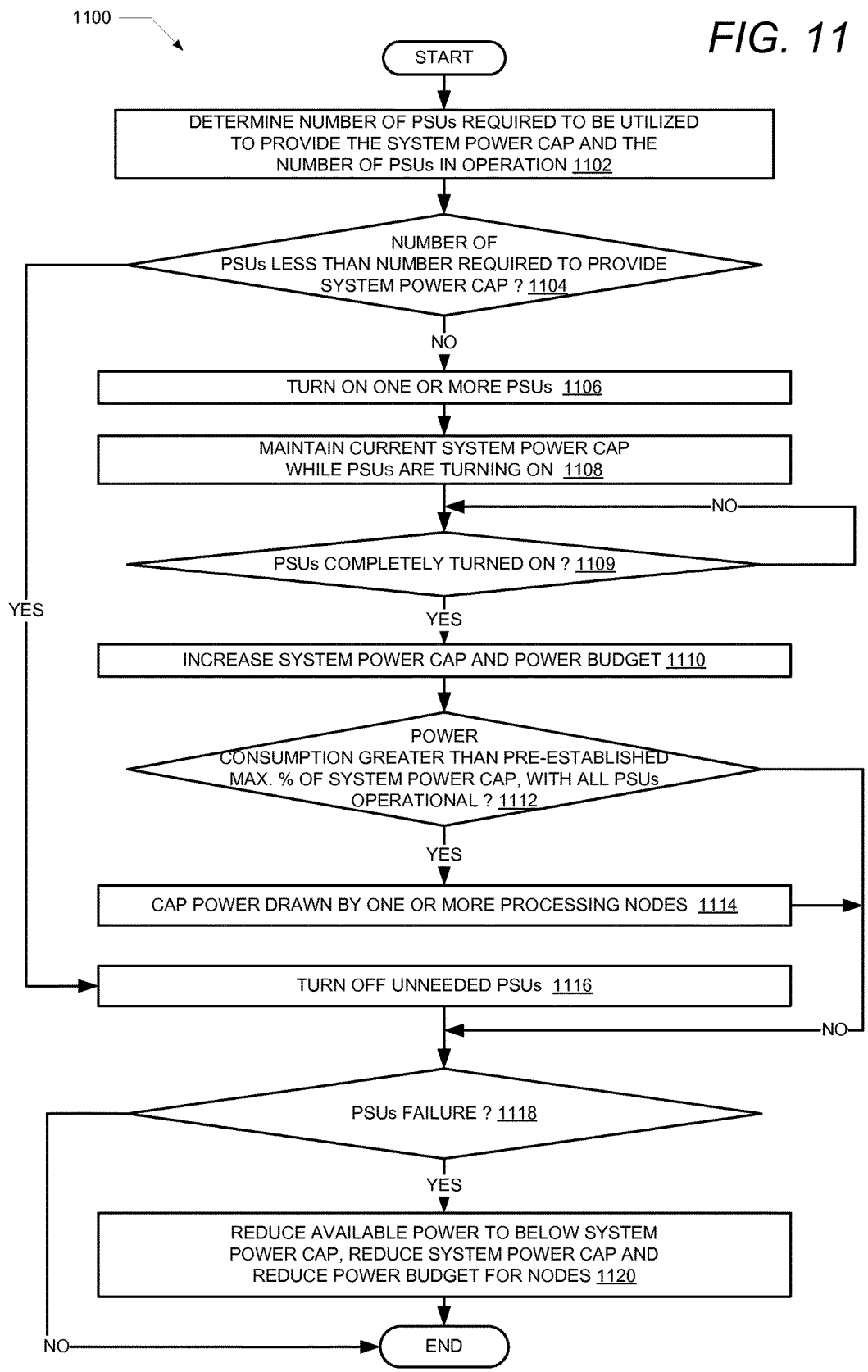
FIG. 11 is a flow chart illustrating one example of the method by which power supply units can be selectively turned on and off based on actual power needs, during operation of an information handling system, according to one or more embodiments.

FIG. 11 illustrates a flow chart of a method to turn power supply units on and off during the operation of IHS 100. Method 1100 begins at the start block and proceeds to step 1102 where MC 110 determines the number of PSU(s) 152 that are required to be utilized to provide the established system power cap 404 and the number of PSU(s) 152 in operation. MC 110 determines if the number of PSUs 152 required to provide the system power cap 404 is less than the total number of active operating PSUs 410 (decision step 1104). In response to the number of PSU(s) 152 required to provide the system power cap 404 being less than the total number of operating PSUs, MC 110 autonomously turns off one or more of the remaining PSU(s) 152 that are not required to provide the system power cap (step 1116) and then proceeds to step 1118. In response to determining at step 1104 that the number of PSU(s) 152 required to provide the system power cap 404 is not less than the total number of operating PSUs, the MC 110 turns on one or more of PSU(s) 152 (step 1106) to enable an increase in the system power cap 404 and a corresponding increase in one or more allocated current power budgets 412 of the processing nodes and/or blocks. These increases are based on historical and current power usage factors. Turning on and off of the PSU(s) 152 is performed based on an efficiency evaluation by MC 110 using one of control algorithms 440 to determine the optimal number of PSU(s) 152 to be in operation to enable efficient use of the PSU(s) 152. MC 110 maintains the current system power cap 404 while the additional PSU(s) 152 are turning on (step 1108). MC 110 determines if the additional PSU(s) 152 have completely turned on (decision step 1109). In response to the additional PSU(s) 152 not being completely turned on, MC 110 continues to check if the additional PSU(s) 152 have completed turning on (step 1109). In response to the additional PSU(s) 152 being completely turned on and supplying additional power to IHS 100, MC 110 increases the system power cap 404 and the current power budget 412 (step 1110).

At decision step 1112, MC 110 determines whether the current power consumption across IHS 100 is greater than a pre-established maximum percentage of the system power cap 404, when all available PSU(s) 152 are turned on. Following the determination that the current power consumption across IHS 100 is not greater than a pre-established maximum percentage of the system power cap 404, when all available PSU(s) 152 are turned on, MC 110 determines if a power supply failure has occurred (step 1118). In response to determining that the current power consumption across IHS 100 is greater than a pre-established maximum percentage of the system power cap 404, when all available PSU(s) 152 are turned on, MC 110 caps the amount of power drawn during operation of one or more of the processing nodes 164 (step 1114). At step 1118, MC 110 then determines if one or more of the PSU(s) 152 have failed.

In response to determining that a failure of one or more of the PSUs has not occurred, method 1100 ends. In response to determining that a failure of one or more of the PSUs has occurred, MC 110 reduces a total amount of the available power to below the system power cap 404, automatically reduces the system power cap, and concurrently reduces one or more allocated power budgets 412 based on an analysis of historical usage per processing node and other factors (step 1120). The automatic reduction of the system power cap can, in one embodiment, include generating a signal on a global throttle wire 272, 273 allocated within each Ethernet cable 226, 170 directly connecting each of the block controllers 162 within IHS 100 with MC 110. The block controllers are pre-programmed to respond to an assertion of a signal on the global throttle wire 272, 273 by immediately reducing the current power consumption of one or more processing nodes 164 within a respective block 160 being controlled by the block controller 162. Method 1100 then terminates.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method to implement rack-level predictive power capping and power budget allocation to processing nodes in a rack-based information handling system (IHS), the method comprising:

receiving, at a rack-level management controller, a plurality of node-level power-usage data and settings from a plurality of block controllers, including a current power consumption and an initial power budget, for each processing node within the IHS, wherein the processing nodes are arranged within blocks, each block having a block controller that handles block-level power allocation and control for all processing nodes within a corresponding block, wherein the rack-level management controller is communicatively coupled to each block controller through an infrastructure manager (IM), which connects to each block controller via at least one Ethernet cable that comprises a global throttle wire directly connecting each of the block controllers within the IHS with the IM, wherein the IM is also communicatively connected to the management controller via another Ethernet cable having a global throttle wire, and each block controller is communicatively coupled to each processing node within a corresponding block via another cable having a node-level global throttle wire allocated therein;

generating a power consumption profile based on the power-usage data for each of the processing nodes;

identifying a total available system power of all power modules supplying power to the IHS, wherein the IHS includes a plurality of power supply units (PSU) each capable of providing a pre-determinable amount of power for use by the components of the IHS and each coupled to and controlled by a power controller;

determining a system power cap for the IHS based on the power consumption profiles and the total available system power;

determining a current power budget for each of the blocks and for each of the processing nodes based on an analysis of at least one of the power consumption profile, the initial power budget, the current power consumption, the system power cap, and the total available system power;

dynamically regulating an amount of power budgeted and supplied to each of the processing nodes of the IHS based on the power consumption profiles and the system power cap; and in response to a detected reduction in a total amount of the available power from all available PSUs to below the system power cap, automatically reducing the system power cap and concurrently reducing one or more allocated power budgets based on an analysis of historical usage per processing node and other factors, wherein automatically reducing the system power cap comprises: generating a signal on the global throttle wire allocated within each Ethernet cable, the global throttle wire being at least one wire in each Ethernet cable that is assigned to provide communication of a global throttle power reduction (GTPR) signal from the rack-level management controller to the IM controller and from the IM controller to each block controller, wherein the block controllers within the IHS are pre-programmed to respond to an assertion of the GTPR signal on the global throttle wire by immediately throttling or substantially reducing processing operations of at least one processing node to reducing an overall power consumption within a corresponding block being controlled by the block controller.

2. The method of claim 1, further comprising:
initializing the management controller during start-up configuration of the IHS;
establishing communication between the management controller, the power subsystem, and the block controllers, which each control block-level operations of processing nodes within a corresponding block;
triggering the block controllers to regulate an amount of power supplied to each of the processing nodes within an associated block based on the current power budget allocated to each of the processing nodes within the associated block;
tracking, via the block controllers, the power-usage data and settings for the processing nodes within the associated block; and
transmitting the power-usage data and settings from the block controllers to the management controller.

3. The method of claim 1, further comprising:
detecting a current power consumption by a first processing node within the IHS;
determining if an increase in the current power consumption has occurred for the first processing node;
in response to determining that an increase in the current power consumption has occurred for the first processing node, determining if the required power to operate all of the processing nodes at current consumption levels is approaching the system power cap; and
in response to determining that the current power consumption by all of the processing nodes is less than the system power cap: increasing the power budget of the first processing node to a new power budget and providing a corresponding increase in the first power allocation to the first processing node; and re-adjusting the power allocation across the IHS based on the new power budget.

4. The method of claim 3, further comprising:
determining if any of the processing nodes are using less than a pre-determined amount of their current power budget allocation over a minimum established period of time; and
in response to determining that at least one second processing node is using less than the pre-determined amount of its current power budget allocation:
re-apportioning at least a portion of an unused power amount from the current power budget allocated to the at least one second processing node to provide a second, higher power budget allocated to the first processing node based on the new power budget; and
increasing the power budget of the first processing node to create the new power budget.

5. The method of claim 1, further comprising:
storing the power consumption profiles within a power consumption history table in a persistent storage device.

6. The method of claim 1, further comprising:
identifying a decrease in the current power consumption for the first processing node;
tracking a period of time over which the decrease in the power consumption occurs;
in response to the period of time not exceeding a pre-established power budget adjustment time (PBAT) threshold, maintaining the current power budget allocated to the first processing node; and
in response to the period of time exceeding the pre-established PBAT threshold:

reducing a value of the current power budget of the first processing node to generate a new power budget; and triggering the power subsystem of the IHS to provide a second power allocation for the first processing node based on the new power budget.

7. The method of claim 6, further comprising:

determining the decrease in the current power budget for the first processing node; and increasing the available amount of power within the system power cap by an amount corresponding to the decrease in the current power budget for the first processing node.

8. The method of claim 7, further comprising:

determining a new power budget to allocate to one or more of the higher-power-usage processing nodes based on the increase in the available amount of power within the system power cap; and triggering the power subsystem of the IHS to provide the new power budget to the one or more processing nodes.

9. The method of claim 1, further comprising:

determining a number of PSUs from the plurality of PSUs that are required to be utilized to provide the system power cap;

in response to the number of PSUs required to provide the system power cap being less than a total number of PSUs, autonomously shutting off one or more of a remaining PSUs that are not required to provide the system power cap;

in response to determining that the current power consumption across the IHS exceeds a pre-established maximum percentage of the system power cap for more than a minimum pre-established threshold period of time, while there are one or more PSUs turned off, turning on at least one of the one or more PSUs to enable an increase in the system power cap and a corresponding increase in one or more allocated power budgets based on power usage factors;

wherein turning on and off of one or more PSUs is performed based on an efficiency evaluation to enable efficient use of the plurality of PSUs; and in response to determining that the current power consumption across the IHS is greater than the pre-established maximum percentage of the system power cap, when all available PSUs are turned on, power capping the operations of one or more processing nodes.

10. The method of claim 9, wherein turning on at least one of the one or more power supplies to enable an increase in the system power cap comprises:

maintaining a current system power cap while the at least one PSU is being turned on; and initiating the increase in the system power cap and subsequent increase in the allocated power budgets only after the at least one PSU has completely turned on and is supplying additional power.

11. An information handling system (IHS) comprising:

one or more blocks, the blocks having at least one block controller and each of the blocks having one or more functional components including one or more processing nodes, the block controllers each controlling block-level operations of the processing nodes within a corresponding block;

a rack-level management controller having a processor and a memory coupled to the processor, the rack-level management controller communicatively coupled to the block controllers and the processing nodes via the block controllers;

a power subsystem communicatively coupled to the rack-level management controller and providing power distribution to a plurality of the functional component of the IHS;

a plurality of power supply units (PSU) each capable of providing a pre-determinable amount of power for use by the components of the IHS and each coupled to and controlled by a power controller; and the rack-level management controller having firmware executing thereon to enable rack level predictive power allocation in a rack-configured IHS, wherein the firmware configures the rack-level management controller to:

receive a plurality of node-level power-usage data and settings from a plurality of block controllers, including a current power consumption and an initial power budget, for each processing node within the IHS, wherein the processing nodes are arranged within blocks, each having a block controller that handles block-level power allocation and control for processing nodes within a corresponding block, wherein the rack-level management controller is communicatively coupled to each block controller, and each block controller is communicatively coupled to each processing node with a corresponding block;

generate a power consumption profile based on the power-usage data for each of the processing nodes;

identify a total available system power from all power modules supplying power to the IHS;

determine a system power cap for the IHS based on the power consumption profiles and the total available system power;

determine a current power budget for each of the processing nodes based on an analysis of at least one of the power consumption profile, the initial power budget, the current power consumption, the system power cap, and the total available system power;

trigger the power subsystem of the IHS to regulate an amount of power budgeted and supplied to each of the processing nodes of the IHS based on the power consumption profiles and the system power cap; and in response to a failure of one or more of the PSUs reducing a total amount of the available power to below the system power cap, automatically reduce the system power cap and concurrently reduce one or more allocated power budgets based on an analysis of historical usage per processing node and other factors, wherein to automatically reduce the system power cap in response to a failure of one or more of the PSUs, the rack-level management controller: triggers generation of a signal on a global throttle wire allocated within each Ethernet cable directly connecting each of the block controllers within the IHS with an infrastructure manager (IM), wherein the IM is also communicatively connected to the management controller via another Ethernet cable having a global throttle wire, the global throttle wire being at least one wire in each Ethernet cable that is assigned to provide communication of a global throttle power reduction (GTPR) signal from the rack-level management controller to the IM controller and from the IM controller to each block controller, wherein the block controllers within the IHS are pre-programmed to respond to an assertion of the GTPR signal on the global throttle wire by immediately reducing the current power consumption of one or more processing nodes within a respective block being controlled by the block controller.

12. The information handling system of claim 11, further comprising
- initializing the rack-level management controller during start-up configuration of the IHS;
- the block controllers having firmware executing thereon, wherein the firmware configures the block controllers to:
- regulate an amount of power supplied to each of the processing nodes within an associated block based on the current power budget allocated to each of the processing nodes within the associated block;
- track the power-usage data and settings for the processing nodes within the associated block; and
- transmit the power-usage data and settings from the block controllers to the management controller.

13. The information handling system of claim 11, further comprising:
- a first block controller detecting a current power consumption by a first processing node within the IHS and the first block controller determining if an increase in the current power consumption has occurred for the first processing node;
- in response to the first block controller determining that an increase in the current power drawn has occurred for the first processing node, the firmware further configures the rack-level management controller to:
  - determine if the required power to operate all of the processing nodes at current consumption levels is approaching the system power cap; and
  - in response to determining that the current power consumption by all of the processing nodes is less than the system power cap: increasing the power budget of the first processing node to a new power budget and providing a corresponding increase in the first power allocation to the first processing node; and re-adjusting the power allocation across the IHS based on the new power budget.

14. The information handling system of claim 11, wherein the firmware further configures the rack-level management controller to:
- determine if any of the processing nodes are using less than a pre-determined amount of their current power budget allocation over a minimum established period of time; and
- in response to determining that at least one second processing node is using less than the pre-determined amount of its current power budget allocation:
  - increase the power budget of the first processing node to create the new power budget; and
  - re-apportion at least a portion of an unused power amount from the current power budget allocated to the at least one second processing node to provide a second, higher power budget allocated to the first processing node based on the new power budget.

15. The information handling system of claim 11, wherein the firmware further configures the rack-level management controller to:
- store the power consumption profiles within a power consumption history table in a persistent storage device.

16. The information handling system of claim 11, wherein the firmware further configures the rack-level management controller to:
- identify a decrease in the current power consumption for the first processing node;
- track a period of time over which the decrease in the power consumption occurs;
- in response to the period of time not exceeding a pre-established power budget adjustment time (PBAT) threshold, maintaining the current power budget allocated to the first processing node; and
- in response to the period of time exceeding the pre-established PBAT threshold:
  - reduce a value of the current power budget of the first processing node to generate a new power budget; and
  - trigger the power subsystem of the IHS to provide a second power allocation for the first processing node based on the new power budget.

17. The information handling system of claim 16, wherein the firmware further configures the rack-level management controller to:
- determine the decrease in the current power budget for the first processing node; and
- increase the available amount of power within the system power cap by an amount corresponding to the decrease in the current power budget for the first processing node.

18. The information handling system of claim 17, wherein the firmware further configures the rack-level management controller to:
- determine a new power budget to allocate to one or more of the processing nodes based on the increase in the available amount of power within the system power cap; and
- trigger the power subsystem of the IHS to provide the new power budget to the one or more processing nodes.

19. The information handling system of claim 11, wherein:
- the firmware further configures the rack-level management controller to:
  - determine a number of PSUs from the plurality of PSUs that are required to be utilized to provide the system power cap;
  - in response to the number of PSUs required to provide the system power cap being less than a total number of PSUs, autonomously shut off one or more of a remaining PSUs that are not required to provide the system power cap;
  - in response to determining that the current power consumption across the IHS exceeds a pre-established maximum percentage of the system power cap for more than a minimum pre-established threshold period of time, while there are one or more PSUs turned off, turn on at least one of the one or more PSUs to enable an increase in the system power cap and a corresponding increase in one or more allocated power budgets based on power usage factors;
  - wherein turning on and off of one or more PSUs is performed based on an efficiency evaluation to enable efficient use of the plurality of PSUs; and
  - in response to determining that the current power consumption across the IRS is greater than the pre-established maximum percentage of the system power cap, when all available PSUs are turned on, power cap the operations of one or more processing nodes.

20. The information handling system of claim 19, wherein turning on at least one of the one or more power supplies to enable an increase in the system power cap causes the firmware to further configure the rack-level management controller to:
- maintain a current system power cap while the at least one PSU is being turned on; and initiate the increase in the system power cap and subsequent increase in the allocated power budgets only after the at least one PSU has completely turned on and is supplying additional power.

* * * * *